Nov. 20, 1956 G. V. NOLDE ET AL 2,771,599

READOUT MECHANISM

Filed March 6, 1953 7 Sheets-Sheet 1

INVENTORS
George V. Nolde
Harold T. Avery
BY
Howard M. Dustin

Nov. 20, 1956 G. V. NOLDE ET AL 2,771,599

READOUT MECHANISM

Filed March 6, 1953 7 Sheets-Sheet 3

INVENTORS
George V. Nolde
Harold T. Avery

BY Howard M. Dustin

INVENTORS
George V. Nolde
BY Harold T. Avery
Howard M. Dustin

INVENTORS
George V. Nolde
Harold T. Avery
BY
Howard M. Dustin

READOUT MECHANISM

Filed March 6, 1953 7 Sheets-Sheet 6

INVENTORS
George V. Nolde
Harold T. Avery
BY
Howard M. Dustin

Nov. 20, 1956 G. V. NOLDE ET AL 2,771,599

READOUT MECHANISM

Filed March 6, 1953 7 Sheets-Sheet 7

INVENTORS
George V. Nolde
Harold T. Avery

BY

Howard M. Dustin.

United States Patent Office 2,771,599

Patented Nov. 20, 1956

2,771,599

READOUT MECHANISM

George V. Nolde, Berkeley, and Harold T. Avery, Oakland, Calif., assignors to Marchant Calculators, Incorporated, a corporation of California Application March 6, 1953, Serial No. 340,841

9 Claims. (Cl. 340—316)

The present invention concerns digital calculating machines, and more particularly concerns readout devices for translating representations of numeral values from an electrical memory into a mechanical numeral wheel register.

Most of the present day calculators that are designed for high speed digital calculation employ electronic computing elements which operate in either the binary system or some modified form of the binary system. In such machines, it has been found expedient to store intermediate and final results in binary form in a high speed electrical or electronic memory and then to read out the final results into some visual display system. For many applications, it is desirable that visual display be in the decimal system. Therefore, it is necessary that the readout mechanism be capable of translating the stored information from the binary system (or modified binary system) to the decimal system.

In machines of the foregoing type, it is also convenient to be able to visually display selected intermediate results, and yet to avoid the unnecessary display of all intermediate results. Hence, it is desirable that the machine operator be able to conveniently choose which of the intermediate results are to be displayed.

The present invention provides means for performing such selective readout of the memories disclosed in the copending application Serial Nos. 219,059 and 219,060 filed April 3, 1951 now Patents 2,690,302 and 2,690,303 respectively. Counting circuits described in the above-named applications are employed as a part of the readout mechanism, in addition to their use as counters.

It is therefore a primary object of the invention to employ the elements of a counting circuit for reading out the representations stored in an electrical or electronic memory.

It is another object of the invention to translate an ordinally accumulated four-signal numeral code into the equivalent angular displacement of a numeral wheel.

It is a further object of the invention to employ a single gas-filled tube for seriatim detection of the presence or absence of a charge on each of a plurality of memory capacitors, and for actuation of mechanism to cause numeral wheel rotation in response to the detection of such a charge.

It is another object of the invention to employ a single vacuum tube for seriatim detection of the presence or absence of a charge on each of a plurality of memory capacitors, and for causing numeral wheel rotation in response to the detection of such a charge.

It is a further object of the invention to rotate a numeral wheel by causing engagement of a clutch in response to the detection of a charge on a memory capacitor.

It is another object of the invention to rotate a numeral wheel through an angle corresponding to the numeral value represented by a charged memory capacitor, in response to detection of the capacitor charge.

It is a further object of the present invention to selectively initiate a readout operation at any completed stage of a calculation.

It is a more particular object of the invention to employ a time delay mechanism for automatically initiating a readout operation after a predetermined time interval in which no calculation keys have been depressed.

The present invention is therefore based upon the principle of detecting the presence or absence of value-representing electrical conditions in a plurality of memory elements, and causing equivalent angular rotation of the related numeral wheels in response to the detection of such conditions.

Other objects and principles will appear in the following detailed description of the invention, reference being made to the accompanying drawings in which.

GENERAL DESCRIPTION

Figure 1:
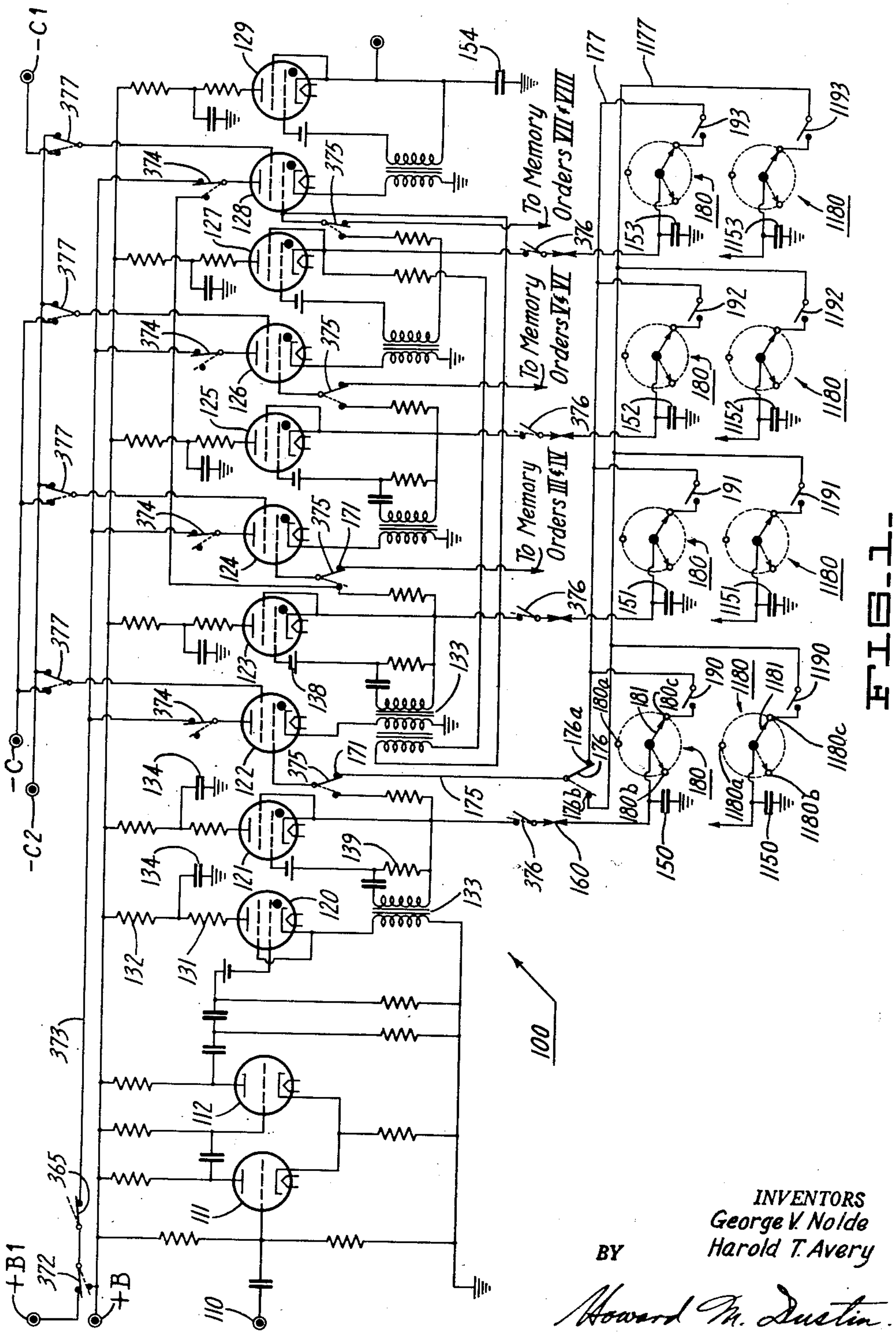
Fig. 1 is a wiring diagram of the thyratron counting circuit and the memory.

The machine herein described comprises an electronic counting circuit, a plural order electrical memory, a numeral wheel register, and mechanism, including the counting circuit, for reading out the memory into the numeral wheel register.

The present counting circuit and memory are of the type disclosed in the above-mentioned application Serial No. 219,059. Briefly, the counting circuit comprises an input section for shaping input pulses, four counting stages, representing the numeral values 1, 2, 4, and 8, respectively, and a transfer stage. The memory comprises ordinal groups of four capacitors, the four capacitors in any ordinal group likewise representing the respective numeral values 1, 2, 4, and 8. During a counting operation in a given denominational order, each memory capacitor in the related ordinal group is coupled to the numerically corresponding stage of the counting circuit. A group of input pulses is fed to the counter and the capacitors are charged in accordance with the number of pulses in the group.

A first input pulse to the first stage causes a measured charge to be stored on the first stage memory capacitor. A second input pulse causes the first stage capacitor to be discharged and causes the second stage capacitor to be charged. Similarly, successive input pulses cause the four memory capacitors to be charged and discharge in binary progression. However, four such binary stages, if unmodified, count to fifteen and return to a zero condition on a sixteenth count. The present machine, however, is based on the decimal system; therefore, provision is made to modify, or "code," the four counting stages in such a way that the capacitors return to a zero condition on each tenth count. The coding circuit comprises a feedback network intercoupling certain stages to eliminate six counts from the unmodified cyclic total of sixteen. The transfer stage is connected to a transfer capacitor and is coupled to the fourth counting stage in such a way that the transfer capacitor receives a charge in response to each tenth count.

When the counting is completed in one denominational order, a commutator disconnects the counter from the four memory capacitors of the order in which the counting occurred and connects the counter to the memory capacitors of a next denominational order. If a transfer charge has been stored in the lower order, it is introduced into the input section of the counting circuit when the latter is connected to the higher order.

Upon completion of the counting in all the desired orders, a readout operation is initiated. In the present machine, provision is made to initiate readout under control of a time delay mechanism which is operated by a calculation control key such as a "+" key or an "×" key. During the time when items or factors are being continuously entered into the machine by depression of the control keys, these keys render the readout delay mechanism effective to prevent a readout operation from being initiated. However, if no control key is depressed for a predetermined length of time, the delay mechanism is permitted to initiate readout.

The memory of the present embodiment comprises eight denominational orders, of which the four odd-numbered orders are read out during the first half of the readout cycle, and the four even-numbered orders are read out during the second half of the cycle.

At the beginning of readout, the counting circuit stages are disconnected from the memory capacitors and uncoupled from each other so that a separate readout sensing unit is formed from each of the last three counting stages and the transfer stage, making four readout units in all. A respective circuit is partially completed from each readout unit to the four capacitors in an odd-numbered memory order. The four capacitors in each odd-numbered order are then successively connected to the related readout unit and energize the latter in accordance with the electrical condition representing the ordinally stored numeral values. The readout units, in turn, cause engagement of ordinal numeral wheel clutches to rotate the respective numeral wheels in accordance with the values stored in the memory elements.

The even-numbered orders are then read out in the same manner as the odd-numbered orders.

At the completion of readout, the counting circuit is reconditioned for counting and is reconnected to the memory capacitors in the same manner in which it was connected before readout.

It will be apparent that the present memory is not limited to the eight orders which are described herein by way of illustration. The number of orders may be increased by using each readout unit for reading out more than two orders or by employing two or more counting circuits operating in parallel or in series. It will also be seen that the invention applies to memories comprising non-capacitive signal storage devices, such as gas tubes, relays, or the like, and that the invention applies to memories employing modes of storage other than the "coded binary" mode described herein, such as pure binary, biquinary, decimal, etc.

THYRATRON COUNTING CIRCUIT

The present counting circuit 100 (Fig. 1), referred to above, includes an input section, four counting stages, and a transfer stage.

The input section includes a pulse former and a pulse amplifier. The pulse former comprises two vacuum triodes 111 and 112 arranged as a "univibrator," and the pulse amplifier includes a normally non-conducting thyratron 120 coupled to the univibrator output. Each stage includes a normally nonconducting "measuring" thyratron 121, 123, 125, 127, and 129, respectively. Also, the second, third, and fourth counting stages and the transfer stage each include a normally non-conducting "breakdown" thyratron 122, 124, 126, and 128, respectively.

When the counting circuit is conditioned for a counting operation, the switches 374, 375, and 376, and the rotary switches 180 and 1180, to be described hereinafter, are in the respective positions shown by broken lines. When the switches are so positioned, the circuit is arranged identically to the circuit shown in Fig. 1 of the previously named application Serial No. 219,059. During a counting operation, the pulse amplifier tube 120 is inductively coupled to the first stage measuring tube 121 through a coupling transformer 133; each breakdown tube is inductively coupled to the measuring tube of the same stage, also by a transformer 133; and the measuring tube of each stage except the transfer stage is resistively coupled to the breakdown tube of the next succeeding stage.

As explained in the last paragraph of application Serial No. 219,059, a tetrode was used as a breakdown tube in each stage of the constructed circuit, wherein the first grid of such tube was used as the anode, while the actual anode was allowed to float free. Consequently, the tube was shown as a triode in that application. In the present circuit, however, the anode of each breakdown tube is employed during readout and is therefore shown in the drawing.

The cathode of the measuring tube of each counting stage is connected, during a counting operation, to a respective memory capacitor, such as 150—153, of the denominational order in which the counting occurs, through a respective switch 376 and a commutator 160. The cathode of the measuring tube 129 of the transfer stage is permanently connected to a transfer capacitor 154. The conduction of any measuring tube therefore stores a charge on the associated capacitor 150—154.

As counting pulses are impressed on an input terminal 110, they are shaped by the univibrator, amplified by tube 120, and coupled to the first stage measuring tube 121. The counting stages cooperate in the manner fully described in the above-mentioned application Serial No. 219,059 to charge and discharge memory capacitors 150—153 in binary progression. A feedback circuit, which includes the transfer breakdown tube 128, operates to return the counting stages to a zero condition in response to each tenth input pulse, and to thereupon store a transfer charge on capacitor 154.

The anodes of the pulse amplifier tube 120 and the measuring tubes 121, 123, 125, 127, and 129 are each connected to +B by two series resistors, such as 131 and 132. A respective capacitor 134 is connected to ground from the junction of each pair of resistors 131 and 132. Since tube 120 and the measuring tubes are normally non-conducting, capacitors 134 are normally charged to +B level. However, if one of the measuring tubes or tube 120 fires, its associated capacitor 134 discharges through the anode-cathode circuit of the conducting tube and lowers the anode voltage of that tube, so that the tube is automatically extinguished. Therefore, when a measuring tube fires, the charge stored on the related memory capicitor is limited, or measured, in accordance with the time required for the capacitor 134 to extinguish that tube.

The charge-bearing conditions of the respective memory capacitors following each unit count is shown in the following Table I, in which an X indicates that the corresponding capacitor is charged at the completion of the designated count:

*Table I*

| | 0 | 1 | 2 | 3 | 4 | 5 | 6 | 7 | 8 | 9 | Carry |
|---|---|---|---|---|---|---|---|---|---|---|---|
| 150 | ---- | X | ---- | X | ---- | X | ---- | X | ---- | X | ------ |
| 151 | ---- | ---- | X | X | ---- | ---- | X | X | ---- | ---- | ------ |
| 152 | ---- | ---- | ---- | ---- | X | X | X | X | ---- | ---- | ------ |
| 153 | ---- | ---- | ---- | ---- | ---- | ---- | ---- | ---- | X | X | ------ |
| 154 | ---- | ---- | ---- | ---- | ---- | ---- | ---- | ---- | ---- | ---- | X |

Upon completion of the counting in a given denominational order, the counting circuit 100 is disconnected from the capacitors 150—153 of the given memory order, and is connected to a second, and identical, set of capacitors, such as 1150—1153, of the next denominational order. The mechanism for switching the counting circut from one memory order to the next includes the commutator 160 shown schematically in Fig. 1. In order to simplify the drawings, only two ordinal groups of memory capacitors, 150—153 and 1150—1153, and their related circuitry are shown. It is to be understood that the remaining six memory orders in the present machine are identical to those shown.

NUMERAL WHEEL REGISTER

The numeral wheel register of the present machine is based on the register disclosed in Avery Patent No. 2,416,369, issued February 25, 1947. The register comprises ordinal numeral wheels 1084 (Figs. 3 and 4) mounted for rotation, in ordinally spaced relationship, on a numeral wheel spline shaft 551. A respective pawl-and-ratchet type dial clutch 510, of the type shown in Fig. 27 of the Avery patent, is integral with each numeral wheel, and reference is made to that patent for a full description of the operation of the dial clutch.

The control mechanism for each ordinal dial clutch includes a clutch dog 608 (Fig. 4) loosely keyed to a shaft 1088. An ear 607 on dog 608 is normally in operative contact with ratchet 1080 of the clutch, thereby restraining the ratchet from rotation to maintain the clutch normally disengaged. A spring 651 urges the dog 608 clockwise in the loose keyway of shaft 1088, normally maintaining the clutch dog 608 in its clockwise, or clutch disengaging position. For engaging the clutch, the dog 608 is rocked counterclockwise (as viewed in Fig. 4) out of contact with ratchet 1080.

A centralizer pawl 600 in each order is mounted for free rocking movement on the shaft 1088 and has a nose 605 which cooperates with notches on a respective centralizer disk 585 integral with each numeral wheel. A member 604 mounted on the machine frame supports a toggle spring 601 which cooperates with an arm 603 on pawl 600 to maintain the latter pawl normally in a clockwise position in engagement with the centralizer disk 585.

During a readout operation, the clutch dog 608 is rocked counterclockwise, by means described hereinafter, engaging the dial clutch to rotate the numeral wheel 1084. When the clutch is engaged, the centralizer disk 585 rotates with the numeral wheel, camming the nose 605 of pawl 600 to the left to rock pawl 600 counterclockwise on shaft 1088, whereupon toggle spring 601 yieldably retains pawl 600 in its counterclockwise position. An ear 612 on the clutch dog 608 overlies pawl 600 and limits the counterclockwise rocking of the latter pawl. When the clutch dog 608 is subsequently rocked clockwise to disengage the clutch, the ear 612 forces pawl 600 clockwise, and the centralizer toggle spring 601 retains pawl 600 in its clockwise position in engagement with a notch on disk 585 to thereby centralize the numeral wheel in a full digital position.

Figures 2, 3:
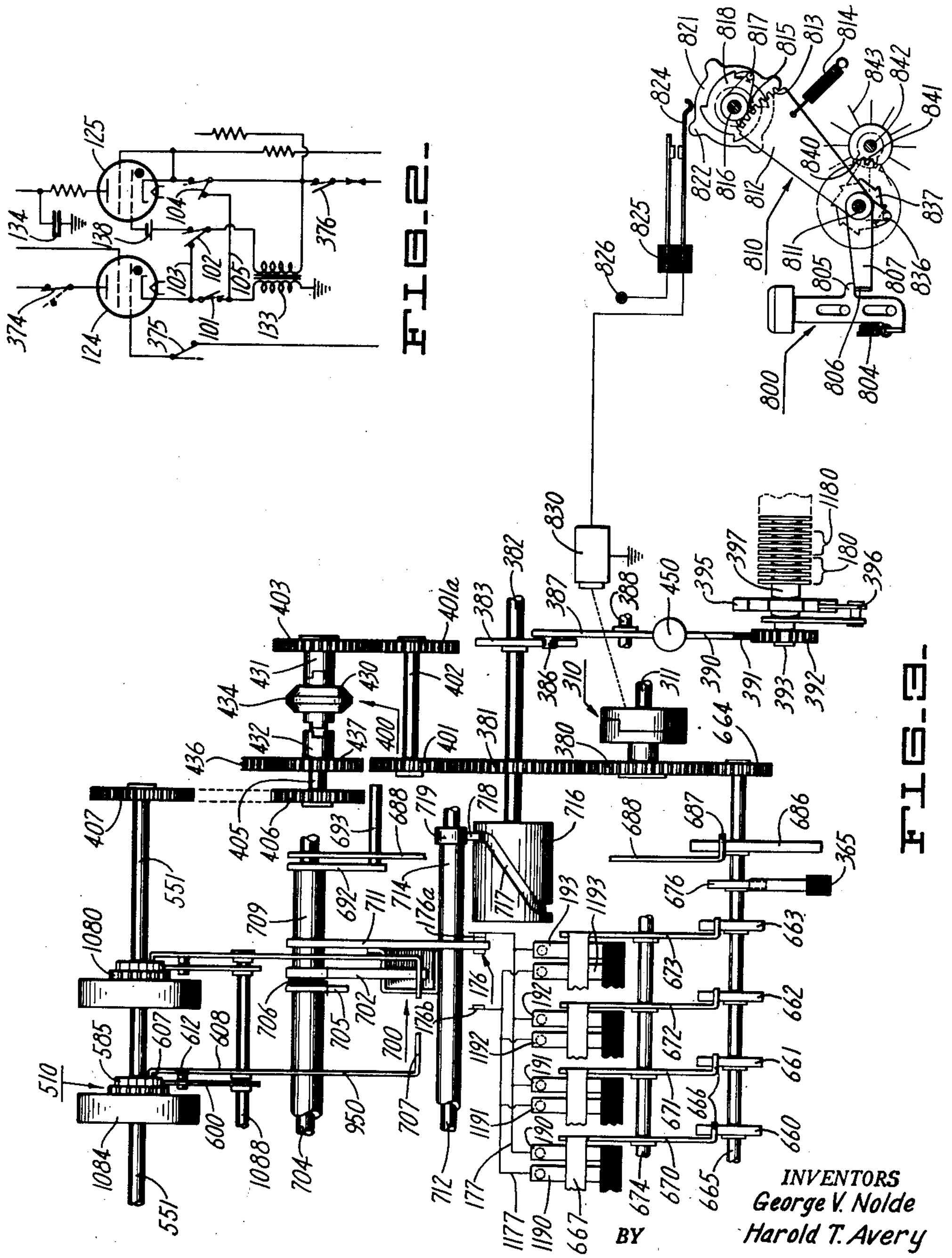
Fig. 2 is a wiring diagram of an alternate embodiment of one stage of the thyratron counting circuit.
Fig. 3 is an over-all schematic diagram of the mechanical elements of the readout mechanism.
Figure 4:
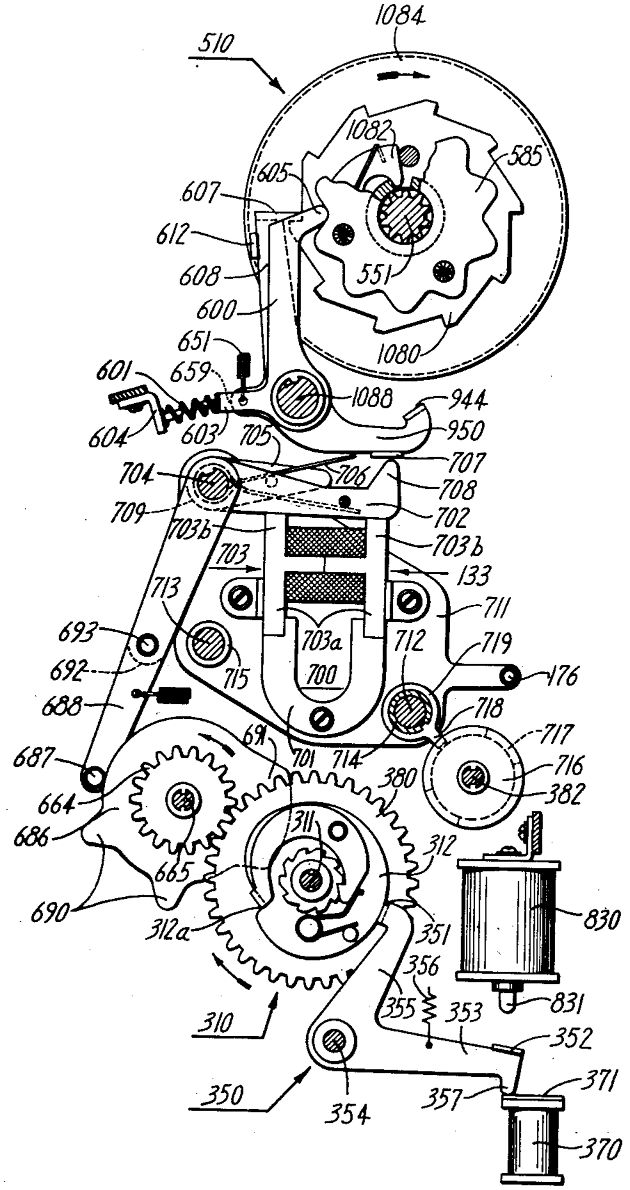
Fig. 4 is a left side view of a typical numeral wheel clutch and the control mechanism therefor.

The mechanism for rocking ordinal clutch dogs 608 counterclockwise to engage the dial clutches includes a plurality of magnet units such as 700 (Figs. 3 and 4). One magnet unit 700 is provided for each two numeral wheel orders, so that there are four units in the present eight order machine.

Each magnet unit 700 comprises a permanent magnet 701 (Fig. 4), an electromagnet 133, and an armature 702. The electromagnets 133, it will be noted, have been described as coupling transformers 133 in the counting circuit 100. Both the primary and secondary windings of each transformer or electromagnet 133 are wound on an H-shaped ferromagnetic core 703. The two lower arms **703*a* of the core abut the arms of the permanent magnet 701, completing a first magnetic circuit through the permanent magnet and the core 703. Each permanent magnet 701, and its related electromagnet 133 are secured to a plate 711, and plates 711 are mounted for sliding movement on a pair of fixed shafts 712 and 713 by a sleeve 714 and a bushing 715**, common to all the plates.

The armature 702 is normally held by magnetic attraction against the two upper arms **703*b* of the core 703, completing a second magnetic circuit parallel to the first magnetic circuit, through the permanent magnet, the core arms 703*a* and 703*b*, and the armature 702. The armature 702 is mounted for free rocking movement upon a hub 709 which is keyed for transverse movement on a shaft 704. The hub 709 is carried by plates 711 for transverse movement therewith. An arm 705 is secured to the hub 709 adjacent to each armature 702 and is yieldably connected to armature 702 by a torsion spring 706**.

At the beginning of readout, armature 702 is in the position shown, the armature being magnetically held against the core 703 as described above. Early in the readout cycle, the shaft 704 is rocked counterclockwise by a mechanism described hereinafter, thereby rocking the arm 705 counterclockwise to the position shown and stressing spring 706. Armature 702, however, being freely mounted on shaft 704, is magnetically held in its clockwise position abutting arms **703*b*, against the tension of spring 706. If the electromagnet 133 is energized while arm 705 is in counterclockwise position, the magnetic flux developed by the windings on the electromagnet is in such a direction that it tends to cancel the permanent magnetic flux through armature 702, and tends to reenforce the flux through the permanent magnet 701. Furthermore, the flux through armature 702 due to the electromagnet is at least as great in magnitude as the flux through the armature due to the permanent magnet. Therefore, as the flux due to the electromagnet builds up in the armature, it reaches a value which cancels enough of the already existing flux in armature 702 so that the armature is pulled free of the magnetic attraction by spring 706 and is rocked counterclockwise into alignment with arm 705**.

The dial clutch dog 608 has a lower arm 950 having an ear 707 overlying a nose 708 on the free end of armature 702, so that when armature 702 is rocked counterclockwise, it rocks the clutch dog counterclockwise within the loose keyway of shaft 1088 against the tension of spring 651, to engage the dial clutch in the manner described hereinbefore, thereby commencing rotation of the numeral wheel 1084.

After the numeral wheel has been rotated a predetermined amount, it is necessary to disengage the dial clutch, and this is accomplished by recocking armature 702 to its clockwise position. A recocking mechanism, described hereinafter, rocks shaft 704 clockwise, thereby rocking arm 705 clockwise. Spring 706 urges armature 702 clockwise into alignment with arm 705 so that the armature is reseated on the arms **703*b* of the electromagnet core 703. Spring 651 is thus permitted to rock clutch dog 608** clockwise to clutch disengaging position.

READOUT MECHANISM

*In general.*—The readout operation is initiated by a delay mechanism which energizes various readout circuits when no operation key has been depressed for a predetermined length of time. During the readout operation, the electrical charges stored on the memory capacitors 150—153, 1150—1153, etc., are sensed and employed to actuate mechanism for rotating the appropriate ordinal numeral wheels through angular increments corresponding to the ordinally stored values represented by the capacitor charges.

The readout cycle is divided into two parts. During the first half of the cycle, the four odd-numbered memory orders are simultaneously read out, one by each of the four previously mentioned readout units of the counting circuit, and during the second half of the cycle, the four even-numbered orders are similarly read out. To read out a given memory order, the four capacitors in that order are successively connected to a grid of the breakdown tube of the associated readout unit. If any capacitor bears a charge when it is connected to a breakdown tube, the stored charge fires that tube. The discharge circuit of each breakdown tube includes the primary winding of the related coupling transformer, or electromagnet, 133 (Figs. 1 and 4); therefore the electromagnet 133 is energized and causes engagement of the associated dial clutch 510, so that the numeral wheel 1084 is rotated with the numeral wheel shaft 551 until the clutch is disengaged by mechanism described hereinafter.

*Delay mechanism.*—The calculation initiating key or keys of the present machine control a delay mechanism in such a way that when no items or factors are entered into the machine for a predetermined interval of time, the delay mechanism is permitted to initiate readout. The delay means shown in Fig. 3 is a schematic illustration only, it being understood that any appropriate delay system may be used. Reference is made to Patent No. 2,525,423, issued October 10, 1950 to G. V. Nolde, wherein an appropriate delay mechanism is fully described and is shown in Figs. 21 and 23 of that patent.

In Fig. 3, a single calculation initiating key 800 is shown, which may be, for example, a "+" or a "×" key, although it will be apparent that any of a number of calculation keys may be used to control the readout delay mechanism to be described.

Key 800 is conventionally arranged for vertical movement, and is normally maintained in its upward position by a spring 804. An ear 805 on the key stem overlies an ear 806 on an arm 807 of a bellcrank 810. This bellcrank is fixed to a shaft 811 which is mounted for limited rocking movement, and has an upper arm 812 terminating in a gear segment 813. A spring 814 is secured between the machine frame and arm 812 to maintain the bellcrank in extreme clockwise position, with ear 806 of the bellcrank abutting the ear 805 of key 800 when the latter key is in its upper position. The teeth 813 on arm 812 cooperate with a gear 815 mounted for free rotation on a shaft 816. A pawl mechanism 817 integral with gear 815 is also mounted for free rotation on shaft 816 and cooperates with a ratchet 818 having four teeth equally spaced around its periphery. Ratchet 818 is fixed to shaft 816 for rotation therewith, and a time delay cam member 821 having four equally spaced lobes 822 is likewise keyed to shaft 816. The lobes 822 on cam 821 cooperate with a lower switch blade 824 of a normally open readout solenoid switch 825, so that rotation of cam 821 no more than one quarter turn causes one of the lobes 822 to raise the switch blade 824 sufficiently to close the switch, completing a circuit from a power source 826 through a readout solenoid 830 (Figs. 3 and 4) to ground, thereby energizing the readout solenoid.

The bellcrank 810 normally stands in its extreme clockwise position as shown in Fig. 3, and pawl 817, ratchet 818, and member 821 likewise normally stand in the positions shown. A full depression of key 800 rocks bellcrank 810 counterclockwise sufficiently to rotate gear 815 and pawl 817 slightly more than 90° clockwise, so that the pawl 817 engages a next tooth on ratchet 818. When key 800 is released, bellcrank 810 is rotated clockwise by spring 814, thereby rotating gear 815 and pawl 817 counterclockwise. Pawl 817 drives ratchet 818 and cam 821 counterclockwise to bring the next lobe 822 under the switchblade 824, and to close the readout solenoid switch 825.

A mechanism is provided to retard the clockwise rocking of bellcrank 810, to thereby delay the energization of the readout solenoid for a predetermined length of time. A second pawl mechanism 836 is keyed to shaft 811 and cooperates with a ratchet 837 freely mounted on shaft 811. A gear 840 is integral with the ratchet and is likewise freely mounted on shaft 811. Gear 840 meshes with a gear 841 fixed to a shaft 842. A braking mechanism, schematically illustrated as a "windmill" type rotating member 843 is also fixed to shaft 842 for rotation therewith. Ratchet 837 is arranged to be engaged by pawl 836 only during clockwise rotation of shaft 811; therefore, when key 800 is released from its depressed position and spring 814 rocks bellcrank 810 clockwise, shaft 811 is rotated clockwise, forcing pawl 836, ratchet 837, and gear 840 clockwise, and rotating gear 841 and the windmill member 843 counterclockwise. The gear ratio between gears 840 and 841 is such that the windmill member 843 is rotated rapidly in response to a slow rotation of gear 840, and so retards the clockwise rocking of bellcrank 810. Therefore, when key 800 is released after being depressed, bellcrank 810 is slowly rocked clockwise under the tension of spring 814. It is apparent, then, that recurrent depressions of key 800 repeatedly rocks bellcrank 810 counterclockwise and prevents the bellcrank from being rocked back to its extreme clockwise position by spring 814.

Therefore, if key 800 is depressed a first time and is not subsequently depressed a second time within a predetermined length of time, the above-described rotation of pawl 817 carries ratchet 818 and cam 821 a full 90° counterclockwise. When cam 821 has been moved slightly less than 90° counterclockwise from its original position, e. g. 85°, one of the lobes 822 reaches a position underlying blade 824 of the readout switch 825, closing that switch to initiate readout. On the other hand, if key 800 is depressed again before member 821 has rotated far enough to close switch 825, pawl 817 is rotated clockwise as described above, but ratchet 818 remains stationary so that the pawl does not engage a next tooth on the ratchet and, when key 800 is released, the pawl 817 moves counterclockwise, merely overtaking the same ratchet tooth with which it was engaged before the key was again depressed. Therefore, the key 800 must remain unoperated for the full delay time before the readout solenoid 830 is energized to initiate a readout operation.

READOUT CLUTCH

Energization of the readout solenoid 830, in the manner described above, initiates the readout operation. The readout solenoid starts the machine motor and operates a one-cycle readout clutch which, in turn, operates mechanisms for performing the following functions: (1) conditioning the counting circuit 100 for readout; (2) rotating the numeral wheel shaft 551 (Figs. 3 and 4); (3) serially connecting the four memory capacitors in each of the odd-numbered orders to the related readout unit; (4) after one-half of the readout cycle, associating the even-numbered memory orders with the respective readout units of the counting circuit; (5) serially connecting the four memory capacitors in each of the even-numbered orders to the related readout unit; and (6) at the end of the readout cycle, reconditioning the counting circuit 100 for a counting operation.

Referring to Fig. 4, the readout solenoid 830 has a plunger 831 which is ejected downwardly when the solenoid is energized. Plunger 831 cooperates with an ear 352 on a lower arm 353 of a bellcrank 350. The bellcrank 350 is mounted for rocking movement on a shaft 354 and has an upper arm 355 which functions as a clutch dog in cooperation with a single-cycle readout clutch 310. Clutch 310 is mounted on a spline shaft 311 driven by the machine motor (not shown). The readout clutch 310 may be of any conventional single-cycle type, but is illustrated in Fig. 4 as the ratchet-type clutch shown in Fig. 3 of Avery Patent No. 2,162,238, issued June 13, 1939, and fully described in that patent. The operation control of the clutch 310 is briefly as follows.

Normally, an ear 351 of the bellcrank arm 355 rests in a notch 312*a* of a clutch disc 312, maintaining the clutch disengaged so that it cannot rotate with shaft 311. A spring 356 is connected between the machine frame and the lower arm 353 of bellcrank 350, urging the bellcrank counterclockwise. When arm 355 is rocked clockwise, lifting ear 351 out of notch 312*a*, the clutch is engaged in the manner described in the last-named Avery patent, and rotates with shaft 311. If arm 355 is rocked back into contact with the clutch before the latter has completed one cycle of rotation, then ear 351 rides on the periphery of disc 312 and falls into notch 312*a* to disengage the clutch at the end of one cycle of rotation.

When the readout solenoid 830 is energized, plunger 831 engages ear 352 of the bellcrank arm 353, rocking the bellcrank clockwise against the tension of spring 356, thereby engaging the readout clutch 310 in the manner described above. Solenoid 830 is de-energized before clutch 310 has completed one cycle of rotation; therefore, plunger 831 moves upward and bellcrank 350 is spring urged counterclockwise so that the ear 351 is permitted to disengage the clutch at the end of its first complete rotation.

READOUT CONDITIONING SWITCHES

A lug 357 on the bellcrank arm 353 overlies a plunger 371 of a gang switch 370, the arrangement being such that when bellcrank 350 is rocked clockwise by the readout solenoid, lug 357 depresses plunger 371, thereby operating switch 370.

The switch 370 may be any conventional gang-type switch, the details of which are omitted for the sake of simplicity, and is effective upon being operated, as described above, to operate the following individual switches: (1) the power switch to the machine motor (not shown) is closed, starting the motor in operation to rotate shaft 311 (Figs. 3 and 4); (2) an anode supply switch 372 and four switches 374 (Fig. 1) are moved to the positions shown by solid lines, thereby supplying an appropriate +B1 readout anode voltage to the breakdown tubes 122, 124, 126 and 128; (4) a second group of four switches 375 (Fig. 1) are moved to the positions shown by solid lines, thereby uncoupling the counting stages and the transfer stage from each other, and coupling the second grids of breakdown tubes 122, 124, 126, and 128 each to a respective readout terminal 171; (5) a third group of four switches 376 are opened, thereby disconnecting the cathode of the measuring tube in each counting stage from the related memory capacitors; and (6) a fourth group of four switches 377 are moved to the positions shown by solid lines, thereby changing the grid bias voltages to a —C2 level appropriate for the readout operation.

The six above-described switching operations performed by gang switch 370 condition the counting circuit for readout. During the single revolution of the readout clutch 310, bellcrank 350 is maintained in a clockwise position by the camming action of the clutch on arm 355, as described in the aforementioned Avery patent. Therefore, the nose 357 on bellcrank arm 353 maintains gang switch 370 in its closed, or readout, position during substantially the entire revolution of clutch 310.

ROTARY SWITCH OPERATION

The readout circuit for the first and second memory orders is as follows. The first grid of breakdown tube 122 is connected, through switch 375, readout terminal 171 and a lead 175 to a double-throw switch 176 (Figs. 1 and 3) which, during the first half of the readout cycle is closed to the right as viewed in Figs. 1 and 3. The righthand terminal 176*a* of switch 176 is connected by a bus 177 to one side of each of four normally open sensing switches 190—193. The remaining side of each switch 190—193 is connected to a readout contact 180*c* on a respective one of four rotary switches 180 (Figs. 1 and 3). The switch arm 181 of each of the four rotary switches is connected to the high potential side of a respective memory capacitor 150—153 of the first denominational order.

At the beginning of readout, the arm 181 of each switch 180 is rotated, by means described hereinafter, to engagement with the related readout contact 180*c*, so that a circuit is completed from each capacitor 150—153 through the related switch arm 181, contact 180*c* to the lefthand terminals of the related switches 190—193.

During readout, the four sensing switches 190—193 are closed sequentially, by mechanism later described, serially connecting the four capacitors 150—153, in the first denominational order, to the second grid of breakdown tube 122, so that any charged capacitor 150—153 fires tube 122. When tube 122 is fired, it energizes the primary winding of the transformer, or electromagnet, 133 to engage the first ordinal dial clutch 510 (Fig. 4) in the manner previously described, thereby rotating the first ordinal numeral wheel in accordance with the numeral values represented by those capacitors 150—153 which are charged.

When the readout cycle is half completed, switch 176 is closed to the left against contact 176*b*, by mechanism described hereinafter, thereby completing a circuit from the second grid of tube 122 through switch 375, contact 170, lead 175, switch 176, contact 176*b*, and a bus 1177 to one side of each of four normally open sensing switches 1190—1193 associated with the second denominational order. The remaining side of each switch 1190—1193 is connectable, through a respective rotary switch 1180, to a related memory capacitoy 1150—1153 of the second denominational order. The switches 1190—1193 and 1180 are similar in structure and function to the switches 190—193 and 180 described in connection with the first denominational order.

During the second half of the readout cycle, the sensing switches 1190—1193 are sequentially closed so that any charges on the second order capacitors 1150—1153 are detected by tube 122, in the manner described above, to cause the appropriate rotation of the second ordinal numeral wheel. The second grid of breakdown tube 124 is similarly connected to the four memory capacitors in each of the third and four denominational orders (not shown), through switch 375 and readout terminal 171. Likewise, the second grids of tubes 126 and 128 are connected to the memory capacitors in the fifth and sixth, and in the seventh and eighth denominational orders, respectively.

In order to increase the effectiveness of the electromagnets 133 during readout, it may be desirable to employ the secondary transformer winding of each electromagnet in series with the primary winding. This increases the number of effective turns on each electromagnet and thereby increases the magnetomotive force generated when the electromagnet is energized. In order to connect the secondary winding of each transformer 133 into series with the primary, three additional switches are operated in each of the stages of circuit 100 which are to be used as a readout unit. One such stage, the fourth counting stage, is shown in Fig. 2.

A switch 101, normally closed to connect the breakdown tube cathode to the high potential side of the transformer primary, is opened to break that connection. A switch 102, normally closed to complete a circuit from the measuring tube control grid, through a grid bias source 138, switch 102, and the secondary winding of the transformer to the cathode of tube 125, is thrown to a position connecting the high potential side of the transformer secondary through a lead 103 to the breakdown tube cathode. Finally, a switch 104, normally closed in series between the measuring tube cathode and the low potential side of the secondary transformer winding, is thrown to a position connecting the low potential side of the secondary winding to the high potential side of the primary winding through a lead 105. Therefore, a circuit is completed comprising the breakdown tube cathode, lead 103, switch 102, the transformer secondary, switch 104, lead 105, the transformer primary, and ground.

DRIVE MECHANISM FOR ROTARY SWITCHES

The mechanism which accomplises the previously described rotation of rotary switches 180, 1180, etc. is as follows.

A readout drive gear 380 (Fig. 4) is rotatably mounted on the readout clutch shaft 311 and is secured to the readout clutch 310 for rotation with shaft 311 when the readout clutch is engaged. Gear 380 drives a gear 381 (Figs. 3 and 5) fixed to a shaft 382. The drive ratio between gears 380 and 381 is unity. A cam 383 fixed to shaft 382 has two adjacent lobes 384 and 385 on its periphery. A cam follower roller 386, mounted on one end of a lever 387, is adapted to roll along the periphery of cam 383, while the remaining end of the lever terminates in a gear segment 391. Lever 387 is pivotally mounted on a shaft 388 and is urged counterclockwise by a spring 390 secured to the machine frame. Gear segment 391 meshes with a gear 392 freely mouned on a shaft 393 and secured to a pawl mechanism 396 which is likewise freely mounted on shaft 393. A ratchet 395 having three teeth equally spaced at 120° is fixed to shaft 393 and cooperates with pawl 396. The rotary switch arms 181, 1181, etc. (Figs. 1 and 3), are mounted on a hub 397 keyed to shaft 393 for rotation therewith.

Figure 5:
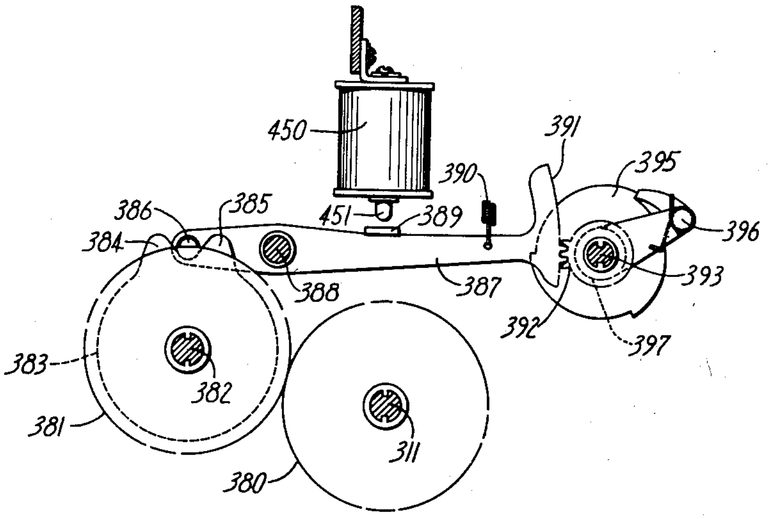
Fig. 5 is a right side view of the rotary switch drive mechanism.

Prior to a calculation on the present machine, the switch arms 181, 1181, etc., of the rotary switches 180, 1180, etc., are in their vertical positions at contacts **180*a*, 1180*a*, etc., respectively. A solenoid 450 (Figs. 3 and 5) mounted on the machine frame, has a plunger 451 overlying an ear 389 on lever 387, so that when the first factor or item is entered into the machine after a readout, by depression of a calculation key, solenoid 450 is energized by a circuit described in the copending application Serial No. 340,842, filed on even date herewith, which describes a "read-in" mechanism for charging the memory capacitors in accordance with the values displayed on the numeral wheels. When solenoid 450 is energized, plunger 451 is forced downward against ear 389, rocking lever 387 clockwise about shaft 388, so that gear segment 391 rotates gear 392, pawl 396, ratchet 395, shaft 393, and switch arms 181, 1181, etc., 120° counterclockwise. This 120° rotation of switch arms 181, 1181, etc., brings the switch arms to respective blank contacts 180*b*, 1180*b*, etc., where the switch arms remain during the calculating operation, at which time the values are entered into the memory. When solenoid 450 is de-energized, plunger 451 returns to its upward position, as shown in Fig. 5, and lever 387 is rocked counterclockwise by spring 390, raising gear segment 391 to rotate gear 392 and pawl 396 clockwise, so that the pawl engages a next tooth on ratchet 395. Therefore, the switch arms 181, 1181, etc., stand at contacts 180*b*, 1180*b*, etc., at the end of the calculating operation and the beginning of the readout operation. Also, at the beginning of readout, the roller 386 is in the position shown, between the lobes 384 and 385 on cam 383**.

When the readout clutch is engaged, gear 380 is rotated counterclockwise (as viewed in Fig. 5), to rotate gear 381, shaft 382, and cam 383 clockwise. Lobe 384 of cam 383 rides under roller 386 at substantially the beginning of the readout cycle, rocking lever 387 clockwise about shaft 388 to rotate gear 392, pawl 396, ratchet 395, shaft 393, and rotary switch arms 181, 1181, etc., 120° counterclockwise, in the manner previously described, thereby rotating switch arms 181, 1181, etc., to readout contacts **180*c*** to condition the rotary switches for a readout operation.

When the cam lobe 384 rotates from under roller 386, spring 390 rocks lever 387 counterclockwise to rotate pawl 396 clockwise 120° for engaging a next tooth of ratchet 395.

NUMERAL WHEEL SHAFT DRIVING MECHANISM

Rotation of gear 380 also causes rotation of the numeral wheel shaft 551 as follows.

Gear 381 (Fig. 3) which is driven by gear 380 meshes with a gear 401 keyed to a shaft 402. A gear **401*a*, also keyed to shaft 402, drives a gear 403 rotatably mounted on a shaft 405 and integral with one drive member 431 of a drive selector mechanism 400 of the type shown in Fig. 5 of the previously mentioned Avery Patent No. 2,162,238 and fully described in that patent. The drive selector mechanism has two drive members 431 and 432 rotatably mounted on the central shaft 405, and has a central driven member 430, slidably keyed to shaft 405. Member 430 may engage either of the drive members 431 or 432 by laterally shifting a collar 434 integral with member 430. The collar 434, and therefore member 430, is normally maintained in its rightward position, as shown in Fig. 3, so that member 431 drives member 430 and shaft 405, and for the purpose of the present invention, may be considered as permanently in such drive condition. In the previously mentioned application Serial No. 340,842, however, mechanism is shown for shifting collar 434 to the left, so that shaft 405 is driven by member 432** in order to clear the numeral wheels.

A gear 406 is keyed to shaft 405 for rotation therewith and drives a gear 407 keyed to the numeral wheel shaft 551. Therefore, rotation of readout drive gear 380 causes rotation of the numeral wheel shaft 551 through gears 381 and 401, shaft 402, gears **401*a* and 403, members 431 and 430, shaft 405, gear 406 and gear 407. The drive ratios in the above gear train are such that for each complete rotation of gear 380**, the numeral wheel shaft is rotated approximately 2.2 revolutions for purposes which will become apparent in the later description of the timing of the numeral wheel clutches.

TIMING OF READOUT SENSING SWITCHES

Recapitulating briefly, the odd-numbered memory orders are read out during the first half of the readout cycle, and the even-numbered orders are read out during the second half of the cycle. Each of the four readout units in the counting circuit 100 is employed to read out one ordinal group of capacitors during each half of the readout cycle, e. g., the readout unit comprising tube 122 is first used to read out capacitors 150—153, and then to read out capacitors 1150—1153. The four capacitors of any ordinal group, representing the respective values 1, 2, 4, and 8, are read out by serially connecting them to the breakdown tube of the related readout unit of counting circuit 100. The memory capacitors, such as 150—153, are connected to the breakdown tube, such as 122, of the related readout unit by serially closing the four related sensing switches, such as 190—193.

Since the circuitry involved in reading out any ordinal memory group is similar to that for reading out any other ordinal group, it is deemed sufficient to describe the timing of the sensing switches in one denominational order only, viz. the lowest order, comprising memory capacitors 150—153 and sensing switches 190—193.

As each switch 190—193 is closed, it connects the associated capacitor 150—153 to a grid of tube 122, so that the latter tube is fired if the capacitor is charged, and the tube remains extinguished if the capacitor is uncharged. If a given capacitor 150—153 is charged, so that tube 122 is fired, then the dial clutch 510 in the lowest denominational order is engaged in the manner described hereinbefore to commence rotation of the numeral wheel. While the numeral wheel is rotating, tube 122 is extinguished in preparation for sensing a next capacitor. After the numeral wheel has rotated through a number of digital angular increments corresponding to the value represented by that capacitor which fired tube 122, the dial clutch is disengaged by mechanism described hereinafter.

In the following description, the "readout time" of the various capacitors and the "total time" of the readout cycle will be referred to in terms of the angular increments through which the numeral wheel shaft 551 must rotate to turn the numeral wheel in accordance with the respective values represented by the capacitors 150—153, i. e., 0.1, 0.2, 0.4, and 0.8 rotation of shaft 551, corresponding to the values 1, 2, 4, and 8 of capacitors 150—153.

One, and the most obvious, possible manner of sensing the charges on the four capacitors in an ordinal group consists of sensing each capacitor in turn, and providing readout time corresponding to the value of each capacitor after that capacitor is sensed.

Referring back to Table I, it is seen that the above procedure would require enough rotation of the numeral wheel shaft 551 to permit a full readout time for all capacitors, viz: $0.1+0.2+0.4+0.8=1.5$ rotations of shaft 551.

Referring again to Table I, it is seen, however, that the memory capacitors are never charged in any combination representing a value greater than 9. Thus, capacitor 153 (value 8) never bears a charge concomitantly with either capacitor 151 (value 2) or capacitor 152 (value 4). It is therefore possible for capacitors 151 and 152, having a total readout time of $0.2+0.4=0.6$ rotation, to be read out during the 0.8 rotation readout time allotted to capacitor 153, i. e., a particular 0.8 rotation readout time may be devoted to reading out either capacitor 153 or one or both capacitors 151 and 152 with no possibility of interference.

Figure 7:
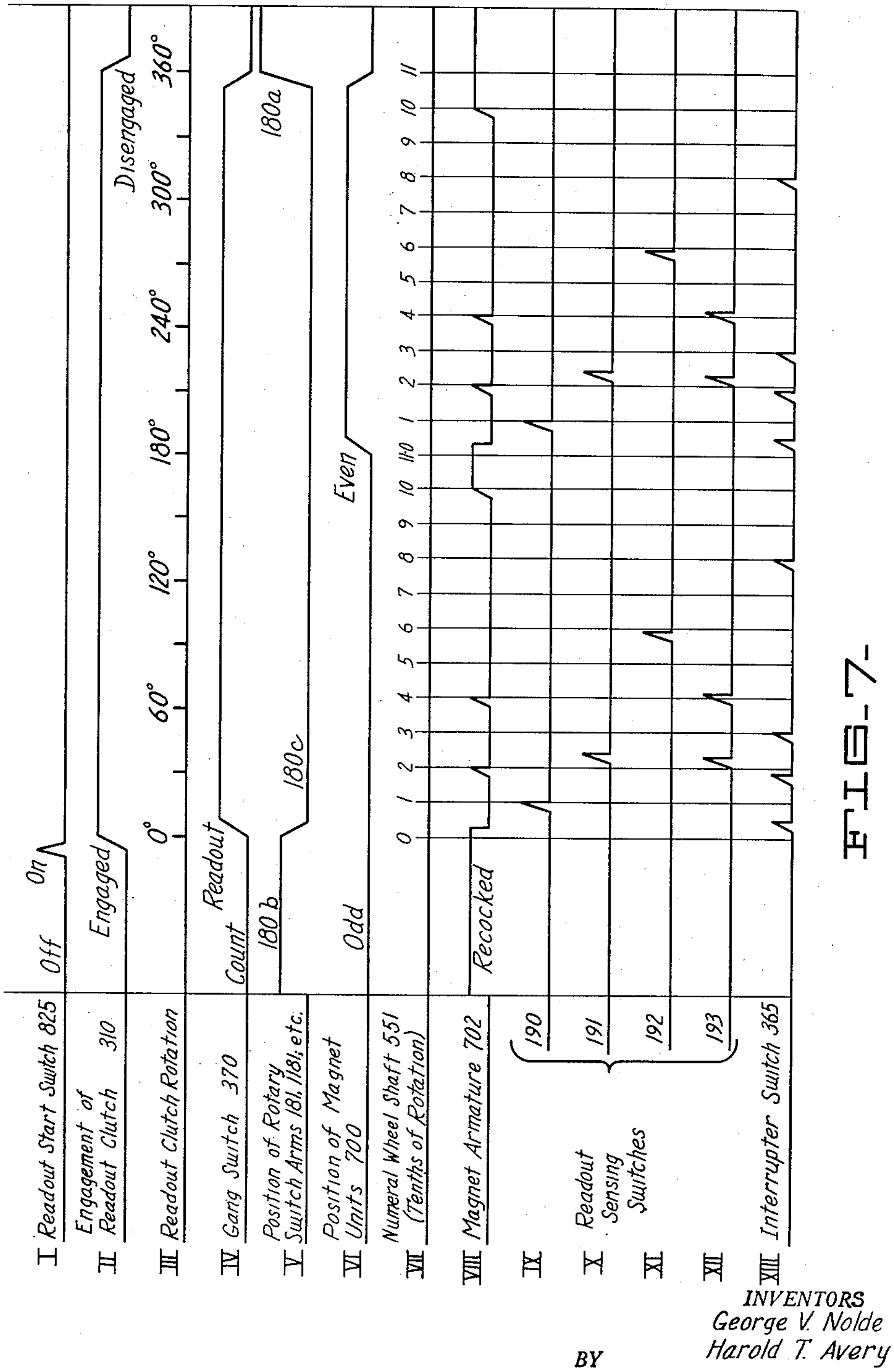
Fig. 7 is a timing diagram of the readout operation, first embodiment.

Accordingly, the sensing switches are closed in irregular order, as illustrated in lines IX—XII of Fig. 7, wherein it is seen that a small rotation of shaft 551 (about 0.1 rotation) occurs at the beginning of the readout cycle before any sensing switches 190—193 are closed. This 0.1 rotation is provided for conditioning the counting circuit for readout in the manner described hereinbefore.

After 0.1 rotation of shaft 551, switch 190 is momentarily closed, and a readout time of 0.1 rotation follows, during which time the numeral wheel is rotated 0.1 rotation if a charge was sensed on capacitor 150. Shortly before the end of the 0.1 readout time allotted to capacitor 150, mechanism is actuated for recocking the magnet armature 702, as illustrated in line VIII of Fig. 7, so that if clutch 510 has been engaged by the firing of tube 122, it is disengaged at this time to limit the numeral wheel rotation to 0.1 rotation. Also during the 0.1 rotation readout time devoted to capacitor 150, the breakdown tube 122 is extinguished, as illustrated in line XIII of Fig. 7.

It should be noted that considerable latitude is permissible in the exact timing of the engaging and disengaging of clutch 510, since the centralizer pawl 600 (Figs. 3 and 4) is effective to center the numeral wheel at an exact digital position, even though the numeral wheel has been rotated slightly more or less than an exact number of digital increments. The extinction of tube 122 may also be timed with latitude since it is only necessary that this tube be allowed to conduct long enough to energize the electromagnet 133 (Fig. 4) and extinguished in time to sense a next capacitor.

Following the 0.1 readout time for capacitor 150, switch 193 is momentarily closed, so that tube 122 is fired to engage the dial clutch if capacitor 153 is charged. Immediately after switch 193 is reopened, switch 191 is closed to sense capacitor 151. Recalling that capacitors 151 and 153 are never concomitantly charged during readout, it will be apparent that tube 122 may be fired to engage clutch 510 at approximately 0.2 total time by either capacitor 151 or capacitor 153, or neither, but never by both.

During the interval from 0.2 to 0.4 total time, tube 122 is extinguished, and shortly before the end of this interval, the dial clutch disengaging mechanism is actuated to end the 0.2 readout time associated with capacitor 151. At approximately 0.4 total time, switch 193 is closed again, so that if capacitor 153 is charged, the dial clutch is re-engaged to continue the 0.8 readout time associated with capacitor 153. The time lost in disengaging and re-engaging the dial clutch, during the readout of capacitor 153, is small enough to be compensated for by the dial centralizer.

At approximately 0.6 total time, switch 192 is momentarily closed to refire tube 122 if capacitor 152 is charged (in which case capacitor 153 cannot be charged—see Table I). At 1.0 total time, the clutch disengaging mechanism is again actuated to end the 0.4 readout time for capacitor 152 or the 0.8 readout time for capacitor 153. During the interval from 0.6 to 1.0 total time, tube 122 is extinguished if it has been fired at 0.6 time.

Therefore, the entire set of four capacitors 150—153 is read out in 1.0 rotation of shaft 551 (plus the 0.1 rotation incident to conditioning the readout switches), rather than in the 1.5 rotations required by the previously outlined straight-sequential method.

During the first half of the readout cycle, all of the odd-numbered orders are simultaneously read out in the manner described above, and, during the second half of the cycle, the even-numbered orders are likewise read out.

REGENERATION

It is to be pointed out that when a breakdown tube, such as tube 122, is fired by a charge on a capacitor, such as 150, the charge is automatically regenerated to a standard level by the action of the firing electrode in the manner fully set forth in the copending application Serial No. 174,867 filed July 20, 1950. Therefore, when a charge on capacitor 153, 1153, etc. fires the related breakdown tube, the charge is not drained and lost, but is regenerated, so that the tube can be subsequently refired at 0.4 total time by the same charge after the tube has been temporarily extinguished in accordance with the readout timing code.

OPERATION OF SENSING SWITCHES

The mechanism which accomplishes the above-described timed closing of the sensing switches 190—193, 1190—1193, etc. is as follows.

The readout drive gear 380 (Figs. 3, 4 and 6) drives a gear 664 keyed to a shaft 665. Gear 664 is driven two full revolutions for each revolution of gear 380. Four switch operating cams 660—663 (Figs. 3 and 6) are also keyed to shaft 665. Four cam follower levers 670—673 are pivotally mounted on a shaft 674, each lever 670—673 having a tip 666 on one end cooperating with a respective cam 660—663. An insulation piece 667 on the remaining end of lever 670 overlies the upper blades of each of the eight normally open sensing switches 190, 1190, etc., associated with the lowest value capacitor 150, 1150, etc., of each memory order. Similarly, insulation pieces 667 on levers 671—673 each overlie the upper blades of the eight switches 191, 1191, etc.; 192, 1192, etc.; and 193, 1193, etc., respectively, associated with the second, third and fourth capacitors of each memory order. The upper blades of switches 190—193, 1190—1193, etc., are normally in the raised position shown in Fig. 6 and act as leaf springs to maintain levers 670—673 in their counterclockwise positions (as viewed in Fig. 6) with the tips 666 in constant contact with the related cams 660—663.

Each cam 660—662 has one lobe 680—682, respectively, while cam 663 has two lobes **683*a* and 683*b*. As cams 660—663 rotate during readout, the lobes ride under the tips 666, rocking levers 670—673 clockwise to momentarily close the respective switches 190—193, 1190—1193, etc. The lobes 680—682, 683*a* and 683*b* are angularly disposed, relative to each other, so that switches 190—193, 1190—1193**, etc., are closed at the times described above during each half of the readout cycle, reference being made to lines IX—XII of Fig. 7.

INTERRUPTER SWITCH

Figure 6:
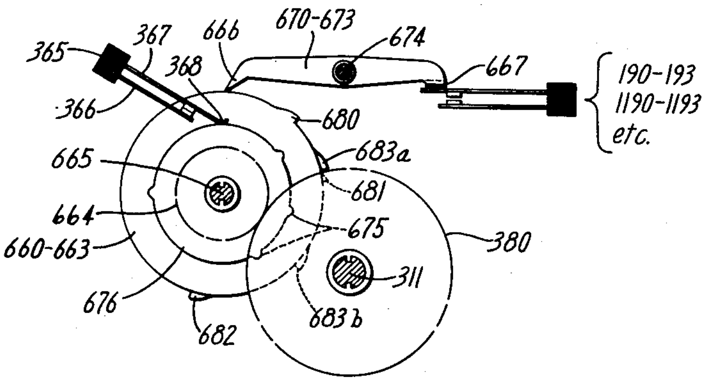
Fig. 6 is a left side view of the sensing switch and interrupter switch cams.

The mechanism for extinguishing the breakdown tubes 122, 124, etc. at the times previously specified (and illustrated at line XIII of Fig. 7) includes a normally closed interrupter switch 365 (Figs. 1 and 6) interposed between the power source +B1 and the anode supply buss 373 and mounted on the machine frame. In Fig. 6 it is seen that switch 365 has a fixed blade 366 and a leaf spring blade 367. A tip 368 on blade 367 cooperates with a series of lobes 675 on a cam 676 keyed to shaft 665. As each lobe 675 passes beneath the tip 368 of switch blade 367, the latter blade is cammed upwardly (as viewed in Fig. 6) to open switch 365. The lobes 675 are so disposed angularly, with relation to lobes 680, 681, etc., on cams 660—663, that the interrupter switch 365 disconnects the power source +B1 from the anode of each breakdown tube 122, 124, etc. to extinguish any of these tubes which are conducting at the times described above and indicated in Fig. 7.

DIAL CLUTCH DISENGAGING MECHANISM

The mechanism, previously referred to, for disengaging dial clutches 510 at the designated times during readout is as follows.

A cam 686 (Figs. 3 and 4) is keyed to the previously described shaft 665, and therefore rotates two times for each rotation of the readout clutch 310. A cam follower roller 687 cooperates with two lobes 690 and a wide-angle raised portion 691 on the periphery of cam 686. Roller 687 is rotatably mounted on one end of an arm 688, the remaining end of arm 688 being rotatably mounted on one end of the magnet armature shaft 704 (Fig. 3). Arm 688 is spring urged counterclockwise about shaft 704 to maintain roller 687 in contact with cam 686. A second arm 692 is integral with the magnet armature hub 709, and supports, at its extremity, a stub shaft 693 which is slidably journaled in a lateral hole in arm 688.

As either lobe 690 or the raised portion 691 rides under the cam follower 687, then arm 688, stub shaft 693, and arm 692 are rocked clockwise (as viewed in Fig. 4), rocking hub 709 and arm 705 clockwise. Armature 702 is forced clockwise into alignment with arm 705 by spring 706, so that the armature seats on arms 703b of the electromagnetic core 703.

As armature 702 is rocked clockwise, its tip 708 falls away from ear 707 on the clutch dog arm 950, so that the clutch dog 608 is rocked clockwise by spring 651 to disengage the dial clutch 510 in the manner previously described.

At the beginning of readout, the cam follower 687 rides on the raised portion 691 of cam 686, so that the magnet armature 702 is maintained in seated engagement with the electromagnetic core 703. Immediately after the engagement of the readout clutch 310, to rotate gear 380, gear 664, and cam 686, the raised portion 691 rides from under the follower 687 so that arm 705 is rocked to its counterclockwise position and armature 702 is held in its clockwise position merely by the flux due to the permanent magnet 701. Therefore, armature 702 is conditioned to be rocked counterclockwise by spring 706 whenever the electromagnet 133 is energized by the firing of the associated breakdown tube 122, 124, etc.

As cam 686 continues to rotate, the lobes 690 pass beneath the cam follower 687, causing armature 702 to be recocked in the manner described above. The angular disposition of lobes 690 is such as to cause recocking of armature 702, and consequent disengaging of clutch 510 at the previously described times illustrated on line VIII of Fig. 7.

Since cam 686 makes two complete rotations during a readout cycle, the lobes 690 are effective, during the second half of the readout cycle, to recock the armature 702 in the same manner as described above.

HALF-CYCLE SHIFT

It is recalled that four magnet units 700 are provided for the present eight denominational orders, and that these units are used to read out half of the memory orders during each half of the readout cycle. To accomplish this, the four magnet units 700 are laterally shifted from a first position of cooperation with the odd-numbered orders, to a second position of cooperation with the even-numbered orders after completion of half of the readout cycle, as illustrated in line VI of Fig. 7.

The mechanism for laterally shifting magnet units 700 includes a shifting device shown as a cylindrical cam 716 (Figs. 3 and 4) keyed to shaft 382. A slot 717 in cam 716 is adapted to receive a follower 718 mounted on a sleeve 719 fixed to the previously described sleeve 714. The slot 717 comprises four sections, one arcuate section near each end of the cylinder, and two transverse sections, connecting the two arcuate sections.

At the beginning of readout, the cylinder 716 rests at a rotated position such that the follower is at one extreme end of the right-hand arcuate section of slot 717. When the readout clutch is engaged, thereby rotating gear 380, gear 381, shaft 382, and the cam 716, the follower 718 is maintained in the right-hand position until the first half of the readout cycle is completed, when one of the transverse sections of the slot 717 is rotated to the top (as viewed in Fig. 3) of cam 716 to shift the follower 718 to the left, and thereby force sleeve 714, magnet units 700, plates 711, hub 703, armatures 702, and arms 705 to the left-hand position in position for cooperation with the even-numbered numeral wheel orders. The arm 692 and the stub shaft 693 are also shifted leftward, shaft 693 sliding through the lateral hole in the stationary arm 688.

The switch arm 176 (Figs. 1, 3 and 4) is mounted on plate 711 and therefore shifts to the left with that plate, so that it is closed against contact 176b during the second half of the readout cycle, thereby connecting the respective firing grids of the breakdown tubes 122, 124, etc. to the buss 177, associated with the even-numbered memory orders.

COMPLETION OF READOUT

Near the end of the readout cycle, and after all eight memory orders have been read out, two mechanical operations occur for reconditioning the machine to count: (1) the cylindrical cam 716 (Fig. 3) which has been rotated to an angular position such that a transverse section of the cam slot 717 engages the cam follower 718, returns the follower to its right-hand position as shown, thereby forcing the magnet units 700 and their related mechanism to the extreme right-hand position; and (2) the lobe 385 (Fig. 5) of cam 383 rides under the cam follower 386, rocking lever 387 clockwise, and then counterclockwise to rotate ratchet 395 an additional 120° counterclockwise, thereby rotating switch arms 181, 1181, etc. to the related contacts 180a, 1180a, etc. (Fig. 1).

The readout cycle is ended when the readout clutch 310 (Figs. 3 and 4) completes one cycle of rotation, bringing the notch 312a of disc 312 into alignment with the ear 351 on the arm 355 of bellcrank 350. Spring 356 rocks bellcrank 350 counterclockwise to seat the ear 351 in notch 312a and thereby disengage clutch 310 in the manner described in the aforementioned Avery Patent No. 2,162,238. As bellcrank 350 rocks counterclockwise, the lug 357 is raised, releasing the plunger 371 of the gang switch 370. Plunger 371 is spring urged to its upward position, thereby: (1) turning off the machine motor; (2) moving anode supply switch 372 (Fig. 1) to its broken line position for counting; (3) opening the four switches 374 (Fig. 1) to disconnect the anodes of the breakdown tubes from the supply buss 373; (4) moving the four switches 375 to their broken line positions to connect the counting stages in cascade; and (5) closing the four switches 376 to reconnect the measuring tube cathodes to the memory capacitors in the same manner in which they were connected before readout.

SUMMARY OF OPERATION OF FIRST EMBODIMENT

The machine includes a mechanical numeral wheel register comprising ordinal ratchet-type dial clutches 510 (Figs. 3 and 4), an eight-order electrical memory (Fig. 1) having four storage capacitors in each denominational order, an electronic counting circuit 100 coupled to the memory, and various mechanisms (Figs. 3, 4, 5, and 6) adapted to translate the value representing condition of the memory into a display of the corresponding numeral values in the register.

During the time when items or factors are being entered into the machine in close succession, a delay mechanism shown in Fig. 3 prevents operation of the readout mechanism. If, however, no calculation key, such as the "+" or the "×" key, is depressed for a predetermined length of time, signifying that no items or factors have been entered into the machine during that time, then the delay mechanism is effective to energize a readout solenoid 830 (Figs. 3 and 4) to initiate a readout operation.

The readout solenoid performs the following functions: (1) it operates a gang switch 370 (Fig. 4) which conditions the counting circuit 100 (Fig. 1) for readout by converting the later circuit into four distinct readout units; (2) it engages a readout clutch 310 (Figs. 3 and 4) for driving the numeral wheel shaft and the readout mechanism (Figs. 3, 4, 5 and 6).

The readout mechanism includes ordinal sensing switches (Figs. 1 and 3), one sensing switch being associated with each memory capacitor. The readout clutch drives cams (Figs. 3 and 6) for sequentially closing the four sensing switches in each denominational order to thereby serially connect the memory capacitors in each of the four odd-numbered orders to a related readout unit. If a capacitor bears a charge when it is sensed, the related readout unit is energized and, in turn, energizes an electromagnet 133 (Figs. 3 and 4), thereby engaging the corresponding ordinal dial clutch to rotate the associated numeral wheel.

When the numeral wheel has rotated through a number of digital increments corresponding to the numeral value represented by the charged capacitor which initiated the rotation, a timed camming mechanism 686, etc. (Fig. 4) disengages the dial clutch to stop rotation.

After the odd-numbered orders have been read out, a cylindrical cam 716 (Figs. 3 and 4), driven by the readout clutch, shifts the electromagnets 133 laterally into association with the even-numbered orders which are then read out in the same manner as above.

SECOND EMBODIMENT

Figure 8:
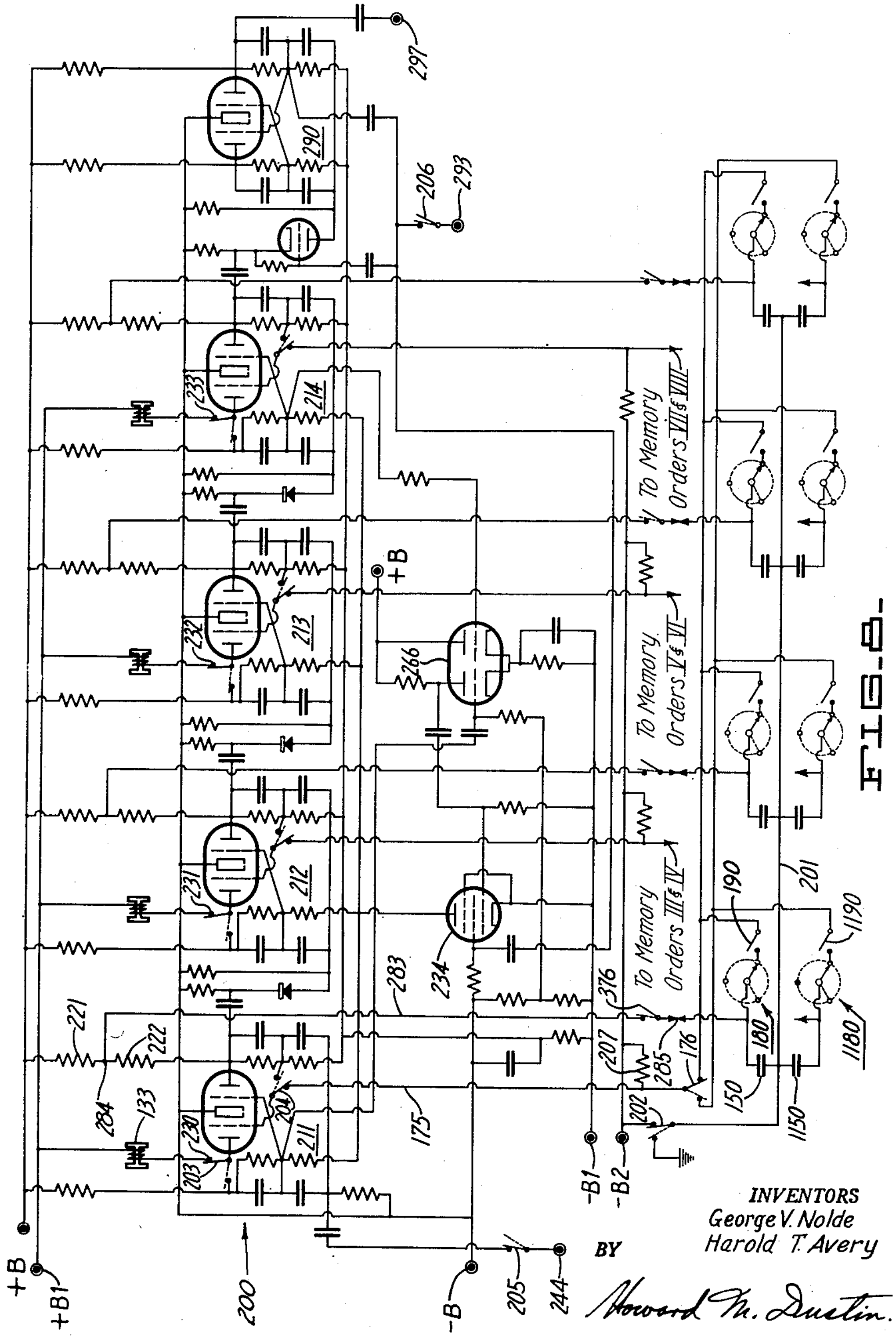
Fig. 8 is a wiring diagram of the vacuum tube counting circuit and the memory.

It is to be understood that the counting circuit 100 shown in Fig. 1 is not the only circuit, within the scope of this invention, which may be employed for reading out a memory of the present general type. An example of a second type of counting circuit which may be incorporated into the readout circuit is the vacuum tube counter disclosed in the copending application Serial No. 219,060 filed April 3, 1951. This counter, shown at 200 in Fig. 8 of the present application, is fully described in the last named application.

Briefly, the counting circuit 200 comprises four cascaded trigger circuit counting stages 211—214 and a transfer stage 290. Each of the four counting stage trigger circuits is coupled, during a counting operation, to a respective memory capacitor, such as 150—153, from the junction 284 of two series plate resistors 221 and 222 in the right-hand section of each trigger circuit, through a lead 283, and a normally closed switch 376. During a counting operation, the low potential side of each capacitor 150—153, 1150—1153, etc., is grounded through a lead 201 and a switch 202 in the position shown by a dashed line in Fig. 8.

Input pulses are introduced through a terminal 244 and a normally closed switch 205 into the first counting stage and cause the four counting stage trigger circuits to shift from one mode of conduction to the other in ordinary binary progression. The potential of the junction 284 in each stage falls or rises in accordance with the conduction or nonconduction, respectively, of the right-hand section of the related trigger circuit, thereby charging and discharging capacitors 150—153 in progression as the counting stages shift from one mode of conduction to the other. A "gate" tube 266 and a "clearing" tube 234 are arranged to return the counting stages to a zero condition after each count of ten, the progression of charges on capacitors 150—153 being identical to that shown in Table I. The transfer stage 290 stores a representation of a transfer if the counting advances beyond "9." A transfer test pulse is introduced, at the proper time, into the transfer stage through a terminal 293 and a normally closed switch 206 to cause the output of a single pulse if the count has progressed beyond "9."

After the counting is completed in one denominational order, the counting stages are connected to a next ordinal group of capacitors by a commutator 285, similar to the commutator 160 shown schematically in Fig. 1.

At the beginning of readout, when the gang switch 370 (Fig. 4) is operated, the present counting circuit is conditioned for readout by moving the following switches (Fig. 8) from the counting positions shown by dashed lines, to the readout positions shown by solid lines; four switches 203, connecting the anode of the left-hand section of each counting stage trigger circuit to a respective readout magnet terminal 230—233; four switches 204, connecting the grid of each left-hand counting stage trigger circuit to a respective readout lead 175; switch 205, disconnecting the pulse input terminal 244 from the first counting stage; the previously-mentioned four switches 376, disconnecting the counting stages from the ordinal capacitor group associated with the counting circuit before readout; switch 202, disconnecting the low potential side of each capacitor 150—153, 1150—1153, etc., from ground and connecting the same to a bias source —B2; and switch 206, disconnecting the transfer test terminal 293 from the transfer stage.

The above switching operations prepare the counting circuit 200 for readout as follows:

The left-hand section of each counting stage trigger circuit is converted into a readout unit with the anode circuit comprising source —B of negative cathode potential, the cathode, the anode, switch 203, the related terminal 230—233, the related one of the previously described four electromagnets 133 (Figs. 4 and 8), and a source of +B1 of positive anode potential. The control grid of each left-hand trigger section is connected to the previously described rotary switch circuit through lead 175 and switch 176. Therefore, closure of the sensing switches 190—193; 1190—1193, etc., connects the related capacitors 150—153, 1150—1153 to the grids of the respective readout units. If a capacitor, such as 150 bears a charge when it is connected to the related readout unit, it biases the tube to conduction, and the conducting plate circuit energizes the electromagnet 133 to operate the corresponding dial clutch (Fig. 4) in the manner hereinbefore described.

It is to be noted that the low potential side of each memory capacitor, being grounded during counting, is connected to the new reference level —B2 during readout since the high potential sides of these capacitors are connected to the grids of the tubes during readout instead of to the anode resistor junctions 284. The reference potential —B2 is of such a value that a stored charge on a capacitor, when applied to the grid of a readout unit tube, biases that tube to a conduction level. The grids of the readout unit tubes are normally maintained at a negative cutoff bias with respect to the cathodes by connecting each grid to —B2 through a respective bias resistor 207, the —B2 potential being slightly more negative than the cutoff bias of the related tube, with respect to the —B cathode potential.

In the present embodiment, the timing of the sensing switches 190—193 is different from that in the first embodiment. It is recalled that in the first embodiment, the fourth stage capacitor in each memory order is sensed twice during readout and, if it fires the related thyratron, its charge is regenerated, before the second sensing, by the action described in the application Serial No. 174,867. No such regenerating action is depended upon in the vacuum tube circuit as shown; therefore, it is necessary to time the closing of the sensing switches 190—193, 1190—1193, etc., so that each capacitor is sensed only once during readout. The most obvious timing again involves straight sequential sensing of the capacitors, with time allowed after each sensing for the numeral wheel to be rotated an amount corresponding to the value represented by the sensed capacitor. But, again, it is possible to rearrange the timing of the sensing switches to require less total rotation of the numeral wheel shaft than is required by the straight sequential sensing.

Figure 9:
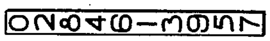
Fig. 9 is a development of one of the numeral wheels employed in the register associated with the vacuum tube counting circuit.

One timing arrangement for the sensing switches involves the reassignment of values to the four capacitors in each memory order for the readout operation, with a corresponding rearrangement of the succession of numerals on the numeral wheels. One such arrangement is where the four capacitor values are changed from 1, 2, 4, and 8 to 5, 1, 3 and 2, respectively. Fig. 9 shows a cylindrical development of a numeral wheel on which the numerals are empirically rearranged so that any possible combination of the above capacitor values, causing numeral wheel rotation of 5, 1, 3 and 2, results in the display of the appropriate numeral at a fixed numeral window.

It will be clear that, purely for the purposes of readout, it makes no difference what values are assigned the capacitors, as long as the numerals can be arranged in some order such that any possible combination of values will additively rotate the numeral wheel to a correct display position. It will further be clear that the arrangement of numerals herein disclosed, and the corresponding arrangement of values assigned to the four capacitors in each group, are only one of many possible sets of arrangements. And it will be seen that the present arrangement is applicable as well to the first embodiment.

Figure 10:
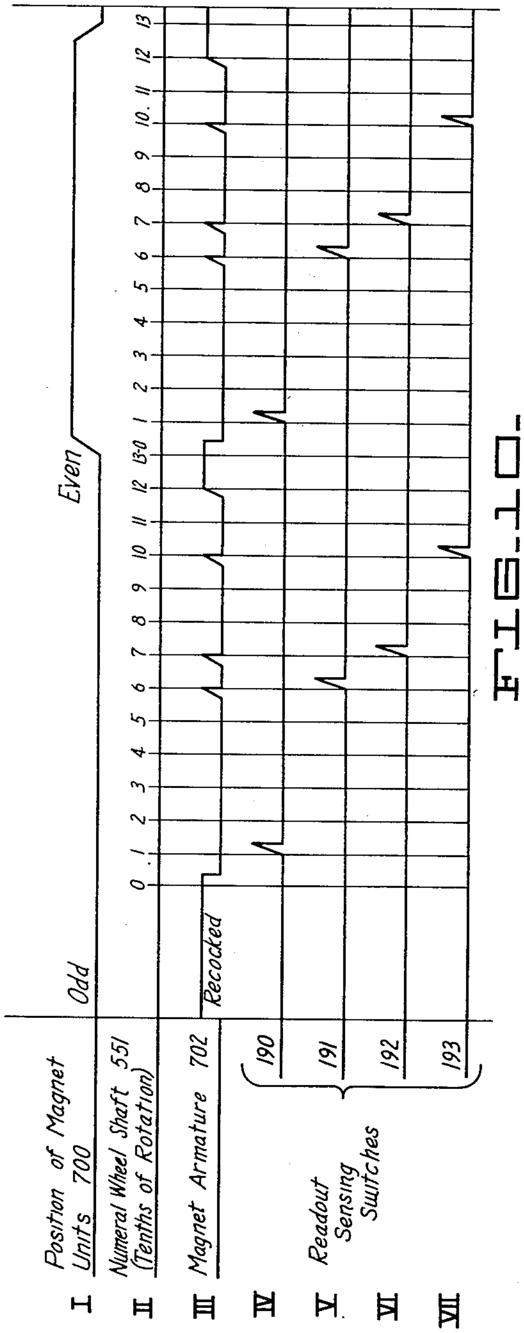
Fig. 10 is a timing diagram of the readout operation, second embodiment.

The lobes on the sensing switch cams 660—663 are repositioned, for the present embodiment, to temporarily close switches 190—193; 1190—1193, etc., at the times shown in Fig. 10 lines IV—VII. The corresponding timing of the re-cocking mechanism for the magnet armatures 702 is shown in Fig. 10 line III.

It is observed that the total readout time for a given order is $0.5+0.1+0.3+0.2=1.1$ rotation of shaft 551, as opposed to 1.0 rotation in the first embodiment. Therefore, the gear ratios in the drive train between the readout clutch 310 and the numeral wheel shaft must be appropriately changed for the present embodiment to cause $2\times1.1=2.2$ rotations of shaft 551 for the two halves of the readout cycle, plus 0.2 rotation for circuit conditioning time, or a total of 2.4 rotations as opposed to 2.2 rotations for the first embodiment.

Since the sensing switches 190—193, 1190—1193, etc. are closed only temporarily, there is no need for the interrupter switch 365 and its related cam 676 in the present embodiment because the vacuum tubes, unlike the thyratrons previously described, do not continue to conduct after the raised grid bias is removed.

The remainder of the circuits and mechanism are identical to those disclosed in the first embodiment.

Although the invention has been described in relation to a four signal binary-decimal code based on the values 1—2—4—8, it will be apparent that the invention applies also to other codes or to binary decimal codes based on other values.

I claim:

1. The combination of: a plurality of capacitors capable of storing electrical charges; means for impressing a selected one of a plurality of combinations of charges on said capacitors, the selected combination of charges representing a respective numeral value and each charged capacitor representing an increment of said value; a sensing circuit; switching means for connecting the sensing circuit to the various capacitors in a predetermined sequence for temporarily energizing the sensing circuit in response to each sensing of a charged capacitor; a movable indicia-bearing member; and mechanism connected to the sensing circuit and responsive to each energization of the latter for imparting to said member a movement proportional to the increment of said value represented by the charged capacitor to which the sensing circuit is connected, whereby the cumulative movement of said member in response to the sensing of said selected combination of charges is representative of said value.

2. The combination of: a plurality of capacitors capable of storing electrical charges; means for impressing a selected one of a plurality of combinations of charges on said capacitors, the selected combination of charges representing a respective numeral value and each charged capacitor representing an increment of said value; a sensing circuit; switching means for connecting the sensing circuit to the various capacitors in a predetermined timed sequence for temporarily energizing the sensing circuit in response to each sensing of a charged capacitor; a cyclically movable indicia-bearing member; operating means connected to the sensing circuit and actuated in response to each energization of the latter to thereby initiate movement of said member; and means cyclically operable in timed relation to said switching circuit for stopping movement of said member at predetermined cyclic times corresponding to the incremental value represented by a sensed charged capacitor, whereby the cumulative movement of said member in response to the sensing of said selected combination of charges is representative of said value.

3. In a computing machine, the combination of: an electronic counter including a plurality of stages, means for supplying selected ordinal pulse groups to the counter, a memory comprising ordinal groups of signal storage devices, a commutator for connecting the counter to the various memory orders in sequence to store signals in the storage devices in combinations representing the respective numbers of pulses in the ordinal pulse groups, means for connecting the storage devices in each of a plurality of memory orders to respective stages in a predetermined sequence to energize a stage in response to each sensing of a stored signal, a visual display means, and means for operatively associating the display means and the stages and actuated in response to energization of any stage by a given stored signal to operate the display means for displaying the numeral value represented by the given stored signal.

4. A computing machine according to claim 3, wherein the electronic counter has four binary stages coupled in cascade and interconnected to complete a cyclic count in response to ten input pulses.

5. A computing machine according to claim 3, wherein the signal storage devices are capacitors.

6. A computing machine according to claim 3, wherein the visual display means comprise ordinally spaced numeral wheels.

7. The combination of, a signal storage device, means for storing a signal in said device, a sensing circuit, cyclically operable switching means for operatively associating the sensing circuit to the storage device at a first differential time in the cycle to energize the sensing circuit in response to the sensing of said stored signal, an electromagnet connected to the sensing circuit and actuated in response to energization of the latter, a numeral wheel shaft rotating in timed relation with the switching means, a numeral wheel rotatably mounted on the shaft, a normally disengaged clutch operable upon being engaged to rotate the numeral wheel with the shaft, means responsive to actuation of the electromagnet for engaging the clutch to the shaft to thereby rotate the numeral wheel with the shaft, and means for disengaging the clutch at a second differential time in said cycle to stop rotation of the numeral wheel.

8. The combination defined in claim 7, wherein the signal storage device is a capacitor.

9. The combination of, a signal storage device, means for storing a signal on said device to represent a numeral value, a sensing circuit, cyclically operable switching means for connecting the storage device to the sensing circuit at a first differential time in the cycle to energize the sensing circuit in response to the sensing of said signal, a numeral wheel shaft rotating in timed relation with the switching means, a numeral wheel mounted for rotation upon said shaft, a normally disengaged clutch operable upon being engaged to rotate the numeral wheel with the shaft, a clutch control member for causing engagement and disengagement of the clutch, means for urging the control member to clutch engaging position, means including a permanent magnet for normally maintaining said member in clutch disengaging position, an electromagnet disposed in proximity to the permanent magnet and connected to the sensing circuit, said electromagnet being actuated in response to energization of the sensing circuit to thereby overcome the effect of the permanent magnet means and permit the control member to engage the clutch, and means for causing the control member to disengage the clutch at a second differential time in said cycle.

References Cited in the file of this patent

UNITED STATES PATENTS

| | | |
|---|---|---|
| 1,498,544 | Fowler | June 24, 1924 |
| 2,002,219 | Dimond | May 21, 1935 |
| 2,010,158 | Kleinschmidet et al. | Aug. 6, 1935 |
| 2,082,725 | Simmons | June 1, 1937 |
| 2,116,372 | Weld | May 3, 1938 |
| 2,294,464 | Lamberty et al. | Sept. 1, 1942 |
| 2,308,306 | Roberts et al. | Jan. 12, 1943 |
| 2,338,242 | Haigh | Jan. 4, 1944 |
| 2,358,477 | Salmon | Sept. 19, 1944 |
| 2,416,369 | Avery | Feb. 25, 1947 |
| 2,481,221 | Joel, Jr. | Sept. 6, 1949 |
| 2,510,072 | Clark | June 6, 1950 |
| 2,514,054 | Hallden | July 4 ,1950 |
| 2,523,300 | Herbst et al. | Sept. 26, 1950 |
| 2,555,622 | Zenner | June 5, 1951 |
| 2,608,346 | Hopkins | Aug. 26, 1952 |
| 2,617,870 | Kern | Nov. 11, 1952 |
| 2,629,827 | Eckert, Jr. | Feb. 24, 1953 |
| 2,643,290 | Hansen | June 23, 1953 |
| 2,647,250 | Herrick | July 29, 1953 |
| 2,652,196 | Sterling | Sept. 15, 1953 |
| 2,668,870 | Ridler | Feb. 9, 1954 |
| 2,694,801 | Bachelet | Nov. 16, 1954 |

OTHER REFERENCES

Proc. of Assoc. for Comp. Mach., "An Experimental Rapid Access Memory Using Diodes and Capacitors," by Hold; September 1952, pp. 133–141.